Figure 1:
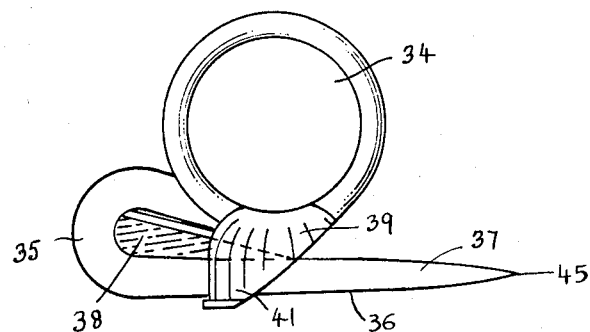

June 19, 1956     G. TARRAZI     2,750,668

PAPER CUTTER WITH MULTIPLE USES

Filed May 19, 1954

INVENTOR:-
GEORGES TARRAZI

By:- Chatwin & Company
ATTYS.

United States Patent Office 2,750,668
Patented June 19, 1956

2,750,668
PAPER CUTTER WITH MULTIPLE USES

Georges Tarrazi, Marseilles, France

Application May 19, 1954, Serial No. 430,872

Claims priority, application France December 2, 1953

5 Claims. (Cl. 30—294)

This invention relates to cutters adapted to be used for cutting sheets of any readily foldable material such as paper.

It is an object of the present invention to provide a cutter including means for preventing distortion, crowding, tearing, and tensioning of the sheet during cutting thereof and whereby a clean cut is obtained.

It is another object of the present invention to provide such a cutter which includes means for shaping the portion of such sheets immediately adjacent the cutting edge of the cutter so that such portion becomes substantially stiff or rigid before it contacts said cutting edge of the cutter and without being tensioned to thereby afford a high cutting speed with a consistent clean cut.

It is a further object of the present invention to provide a cutter including means for progressively folding the sheet while it is being fed toward the cutting edge of the cutter so that at the point of cutting or slightly before the portion of the sheet material immediately adjacent the cutting edge becomes substantially rigid or stiff without being tensioned and presses itself against the cutting edge of the cutter whereby a consistent clean cut is obtained.

It is yet another object of the present invention to provide a cutter including means for shaping and folding the sheet of material whereby the portion of the sheet immediately adjacent the cutting edge of the cutter is rendered substantially rigid or stiff during cutting of the sheet and so that such cutting occurs without exerting any pull on the sheet, the latter being pressed against the cutting edge of the cutter in order that the portion of the sheet immediately adjacent the cutting edge of the cutter is not tensioned during cutting of the sheet.

Figure 2:
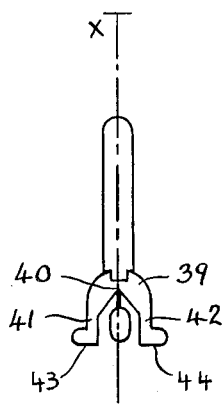

Now referring to the drawing:

Figure 1 is a side view of the paper cutter constructed according to the invention, and Figure 2 is a front end view of the paper cutter shown in Figure 1.

The cutter consists of a curved body which comprises a handle 34 adapted to be used as an advertising or decorative surface, shaping means or deflector 39, a guide extremity 37 and a curved portion 35 between handle 34 and elongated ramp portion 36.

A blade 38 is fixed along the axial cutting plane X—Y of the cutter within the bight of the recess of curved portion 35 and by any of the appropriate or suitable well known means, e. g. clamping or riveting.

The deflector or shaping means 39 is substantially U-shaped and the outer surface of the base of the U is attached to handle 34 so that arms 41, 42 extend in planes parallel to the X—Y plane of the cutter toward ramp portion 36. Arms 41, 42 terminate substantially flush with the bottom of ramp portion 36. The center line 40 of the inside of the base of the U lies in the X—Y plane of the cutter. The inner surfaces of arms 41, 42 flare slightly outwardly from center line 40. Thus, it can be seen that a substantially U-shaped space is formed between the deflector or shaping means 39 and ramp portion 36.

The guide extremity 37 is pointed in order to facilitate positioning the cutter with respect to the sheet of material to be cut.

The cutter may be made from hard plastic or metallic materials. Also, the deflector element 39, curved portion 35, and ramp portion 36 cooperate to provide a guard around the blade 38 for preventing accidental cutting of the hand of the operator of the cutter.

In operation, guide extremity 37 is inserted adjacent the fold or crease of a sheet of material (although a folded or creased sheet is described an initially flat sheet may also be used and in this event the flat sheet will become folded upon engagement with deflector element 39). Eventually the fold or crease becomes alined or centered along the X—Y plane of the cutter as the sides of the sheet on either side of the fold or crease fully engage the inner surfaces of the arms 41, 42 of the deflector or shaping means 39. As shown, the arms 41 and 42 may be provided with feet or bearing surfaces 43 and 44, respectively, which project slightly below the bottom surface of the ramp 36. These sides of the sheet will therefore be pressed by arms 41, 42 to thereby render substantially rigid or stiff the portion of the sides of the sheet in engagement with arms 41, 42 and on up to the fold or crease which at its apex 45 abuts center line 40 of deflector or shaping means 39.

Soon thereafter the point of the fold or crease of the sheet abuts the cutting edge of blade 38. At this instant the fold or crease within deflector or shaping means 39 and adjacent blade 38 is held down or presses down against blade 38 because the sides of the sheet are pressed into shape within shaping means 39. Thus, the portion of the sheet enclosed within deflector or shaping means 39 and on up to the cutting edge of blade 38 is rendered stiff or rigid by the shape it is compelled to assume within deflector or shaping means 39. Since the fold or crease adjacent blade 38 is held down or presses down against blade 38 the fold or crease cannot move up the inclined cutting edge of the blade 38 so that the portion of the sheet immediately adjacent the cutting edge of blade 38 is never tensioned. Actually any possible tensioning is prevented because the vertical component of the cutting force exerted by the cutting edge of blade 38 is opposed and cancelled out by the vertical component of the force which presses or holds down the fold or crease of the sheet against blade 38. Also, the horizontal component of the cutting force exerted by the cutting edge of blade 38 is reduced by the opposing horizontal component of the force which presses or holds down the fold or crease of the sheet against blade 38. The force which presses or holds down the fold or crease of the sheet against blade 38 results from the rigidity, stiffness, or even possible pre-stressing of the portion of the sheet of material within deflector or shaping means 39. The benefit of an inclined cutting edge; that is, easier cutting resulting from the smaller horizontal component of the cutting force is thus not only retained but actually improved due to the further reduction of this component.

It is to be noted that it is immaterial whether the cutter is moved relative to the sheet of material or the sheet of material is moved relative to the cutter. Furthermore, since the sheet is not pressed or tensioned by the blade of the cutter during cutting, control of the cutting operation is simplified to a straight easy unidirectional movement of either the cutter or the sheet of material each with respect to the other during cutting and with a further reduced cutting force; all of these factors being further effective to prevent tearing the sheet of material during cutting. Thus, the cutter functions easily and with great rapidity while still affording a clean cut.

I claim:

1. A paper cutter comprising, an elongated ramp portion having a tapered forward guide extremity and an upright rearward extremity, an upright handle spaced above said ramp portion between said forward and rearward extremities, an inclined cutting blade carried by said rearward extremity of said ramp portion and having a forward edge disposed substantially between said ramp portion and said handle, and paper deflecting arms carried by said handle and extending outwardly and downwardly at opposite sides of said ramp portion adjacent said forward edge of said cutting blade whereby to engage and to fold paper passing to said cutting blade.

2. A paper cutter comprising, an elongated ramp portion having a forward guide extremity and an upwardly and forwardly curved rear extremity forming a loop, an upright handle carried by the forward portion of the loop and spaced above said ramp portion forwardly of said loop, an inclined cutting blade supported in said loop and having its forward edge disposed substantially between said ramp portion and said handle, and paper deflecting arms carried by said handle and extending outwardly and downwardly at opposite sides of said ramp portion adjacent said forward edge of said cutting blade whereby to engage and to fold paper passing to said cutting blade.

3. A paper cutter comprising an elongated ramp having a forward tapered guide extremity, an upright handle above said ramp, a loop connecting the rear portion of the ramp with the lower portion of the handle, an inclined cutting blade disposed within the loop and having its forward portion disposed substantially between the ramp and the handle, said loop forming a guard for the blade, and paper deflecting arms carried by said handle and straddling opposite sides of the ramp adjacent the forward portion of the cutting blade to engage and to fold paper passing to said cutting blade.

4. A paper cutter as set forth in claim 3, wherein the lower portions of the arms terminate in bearing surfaces extending below the bottom surface of the ramp.

5. A paper cutter comprising an elongated ramp having a forward tapered guide extremity, an upright handle above said ramp, a loop connecting the rear portion of the ramp with the lower portion of the handle, an inclined cutting blade disposed within the loop and having its forward portion disposed substantially between the ramp and the handle, said loop forming a guard for the blade, and paper deflecting means carried by said handle adjacent the forward portion of the cutting blade to engage and to guide the passing paper to said cutting blade.

References Cited in the file of this patent
UNITED STATES PATENTS

| | | |
|---|---|---|
| 1,131,141 | Kalenborn | Mar. 9, 1915 |
| 2,042,318 | Lee | May 26, 1936 |
| 2,238,678 | Cook | Apr. 15, 1941 |
| 2,266,916 | Steele | Dec. 23, 1941 |
| 2,439,639 | Tilly | Apr. 13, 1948 |